United States Patent [19]
Arscott

[11] 4,231,469
[45] Nov. 4, 1980

[54] CONVEYOR

[75] Inventor: John R. Arscott, Huntingdon, England

[73] Assignee: Ling Systems Limited, Bedfordshire, England

[21] Appl. No.: 954,200

[22] Filed: Oct. 24, 1978

[30] Foreign Application Priority Data

Jan. 20, 1978 [GB] United Kingdom ................ 2431/78

[51] Int. Cl.³ ............................................. B65G 17/00
[52] U.S. Cl. .................................. 198/779; 193/35 F
[58] Field of Search ............... 198/779, 645, 377, 851; 193/35 TE, 35 F

[56] References Cited

U.S. PATENT DOCUMENTS

| 3,285,395 | 11/1966 | Resener | 198/851 |
| 3,605,993 | 9/1971 | DeRozario | 198/779 |
| 3,770,096 | 11/1973 | Stohlquist | 198/779 X |

Primary Examiner—Robert B. Reeves
Assistant Examiner—Gene A. Church
Attorney, Agent, or Firm—Remy J. VanOphem

[57] ABSTRACT

A conveyor comprises a plurality of interconnected cradles and a rotatable member mounted in each cradle. The rotatable members extend above the respective cradle for rolling contact with an object placed on the conveyor to allow the objects to move relative to the conveyor.

20 Claims, 7 Drawing Figures

CONVEYOR

BACKGROUND OF THE INVENTION

1. Field of the Invention

The present invention relates to a conveyor.

2. Description of the Prior Art

Very often throughout industry there is a requirement to convey objects around a factory and at some stage it is necessary to hold up the flow of objects without undue line pressure from following objects. This is often achieved by means of a series of free idling rollers mounted on shafts and connected at their shaft ends by two parallel chains driven by sprockets. When the object is stopped the idle rollers rotate backwards underneath the object.

Similarly there are many cases where objects are pushed sideways onto a moving or indexing conveyor at one point on its route, and are later removed sideways at another point. During the sideways motions the conveyor belt is subjected to lateral forces which tend to cause the conveyor belt to "track" out of true. There are many ways to overcome this problem, for example the belt can have a centre deep profile running in a track to resist sideways forces.

There are also many cases where it is necessary to separate objects, which are queuing nose to tail on a conveyor, e.g. in order to count them by photo electric detectors. This can be achieved by taking a typical idle roller conveyor as described above and contacting the underside of the idle rollers by a static plate. This will cause the idle rollers to rotate forwardly so that each object is accelerated in turn to twice the speed of the conveyor itself thereby achieving separation.

SUMMARY OF THE INVENTION

The invention provides a conveyor comprising a plurality of cradles, and a rotatable member mounted in each cradle and extending above the respective cradle for rolling contact with an object placed on the conveyor.

Preferably, the cradles are arranged in parallel transverse rows, the cradles of each row being spaced from each other.

Preferably, the cradles of adjacent rows are staggered with respect to each other.

Preferably, the cradles are pivotably carried by rods extending transversely of the conveyor.

Preferably, each row of cradles is carried by two adjacent rods, each rod also acting as one of the rods of the adjacent row of cradles.

The rotatable members may be oriented with their axes of rotation lying in the direction of movement of the conveyor, or transversely of the conveyor. The rotatable members may be removably mounted in the cradles enabling the rollers to be moved from an orientation with their axes of rotation lying in the direction of movement of the conveyor to an orientation with their axes of rotation extending transversely of the conveyor, or vice versa.

Preferably, each cradle comprises end walls having apertures for the rods and two side walls interconnecting the end walls. The cradle may be formed as a single plastics moulding, or the side and end walls may be formed separately.

Alternatively, each cradle has a substantially "H" shape and a rotatable member is arranged on either side of the bridge of the "H", the tie rods passing freely through the cradle and supporting the rotatable members therein.

The conveyor may be provided with any suitable drive. Thus, drive may be by means of cogs engaging spaces between the cradles. Alternatively, the rods may extend laterally along one side of the conveyor and engage holes of a hollow-pin chain. The chain, and hence the conveyor, may than be driven by sprockets. Alternatively, the tie rods may be capped by freely rotating sleeves drivable by sprockets.

In yet a further alternative, the conveyor has a plurality of links, wherein two or more adjacent links from a cradle.

Preferably, each link has when viewed in plan a substantially "H" shape with the bridge of the "H" extended to project laterally outwards from the arms of the "H," the links being arranged in parallel transverse rows, the links of adjacent rows being staggered with respect to each other and the arms of adjacent rows overlapping each other when viewed in a transverse direction such that each cradle is formed by the bridge and one end of the arms of a first link of one row and a bridge extension portion together with one arm of each of a pair of adjacent links of an adjacent row.

Preferably, the links are pivotably carried by rods extending transversely of the conveyor through one end of each arm of one row of links and also through an adjacent end of each arm of an adjacent row.

Advantageously, the rods support the rotatable members for rotation in the cradles.

Preferably, the rotatable members of adjacent rows are aligned with each other when viewed in the direction of movement of the conveyors.

Conveniently, the links are formed from plastics material.

Preferably, alternate rows are provided at each end with edge links each of which when viewed in plan has a substantially "H" shaped with a relatively short bridge projecting laterally outwards from the inner arm only of the "H."

The invention will now be described with reference to four embodiments shown by way of example in the accompanying drawings.

DESCRIPTION OF THE PREFERRED EMBODIMENTS

Figure 1:
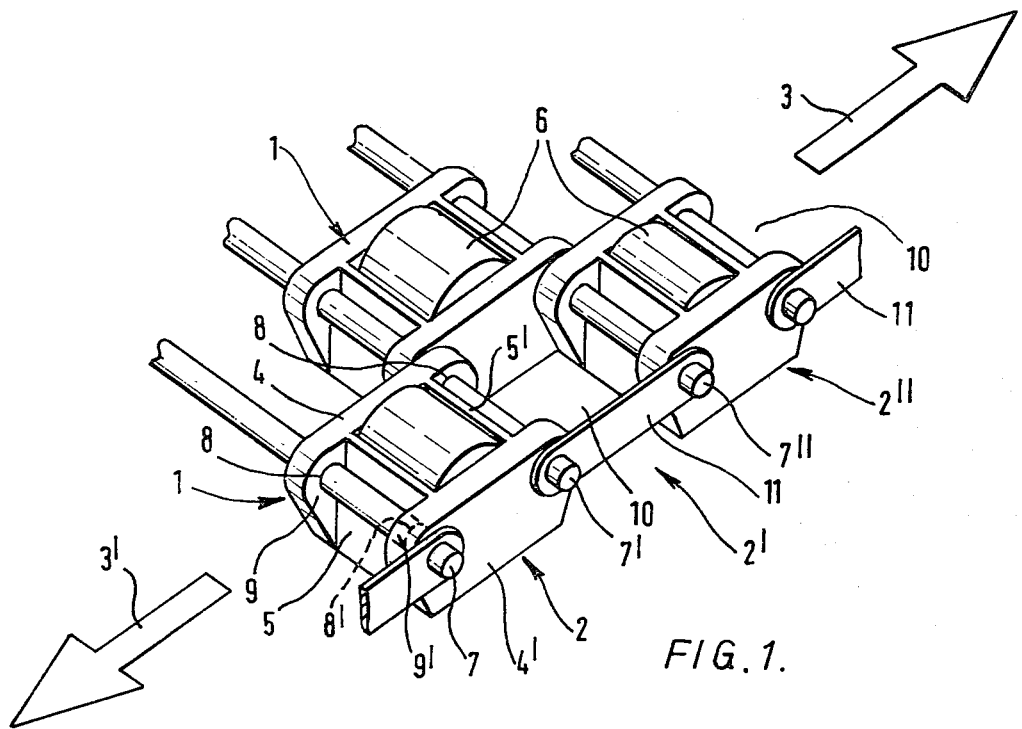
FIGS. 1 to 6 show in perspective view parts of six different conveyors according to the invention.

In FIG. 1, a conveyor comprises a plurality of cradles 1 arranged in rows 2, 2′, 2″ extending transversely of the direction of movement of the conveyor represented by arrows 3, 3′. Each cradle 1 comprises two parallel end walls 4, 4′ interconnected by two parallel side walls 5, 5′. A rotatable member in the form of a wheel or roller 6 having a central axle or two stub axles (not shown) is mounted for free rotation in the cradle with the axle or stub axles engaging recesses or apertures (not shown) in the end walls 4, 4′.

Each cradle 1 is carried by two tie rods 7, 7′ passing freely through respective apertures 8, 8′ in the end walls 4, 4′. To this end, the walls 4, 4′ are trapezoid shaped so as to provide ears 9, 9′ extending beyond the side walls 5, 5′. The apertures 8, 8′ are formed in the ears 9, 9′.

As can be seen from FIG. 1 the cradles in adjacent rows 2, 2' and 2', 2" are staggered with respect to each other, and share a common tie rod, e.g. the cradles in rows 2 and 2' share the common tie rod 7'.

The cradles 1 may be moulded as integral plastics units, or may be separate wall parts assembled on the tie rods 7, 7'. The rollers 6 may also be plastics and may be removably mounted in the end walls 4, 4', e.g. by means of a snap fit.

Since the cradles of adjacent rows are staggered in the direction of travel 3, 3' of the conveyor the cradles are aligned, there being spaces 10 between the cradles of next-but-one rows of cradles. The spaces along each edge of the conveyor are contained by links 11 connecting adjacent tie rods on either side of each space, e.g. rods 7' and 7".

The conveyor may be driven by means of sprockets engaging the spaces 10.

Figure 2:
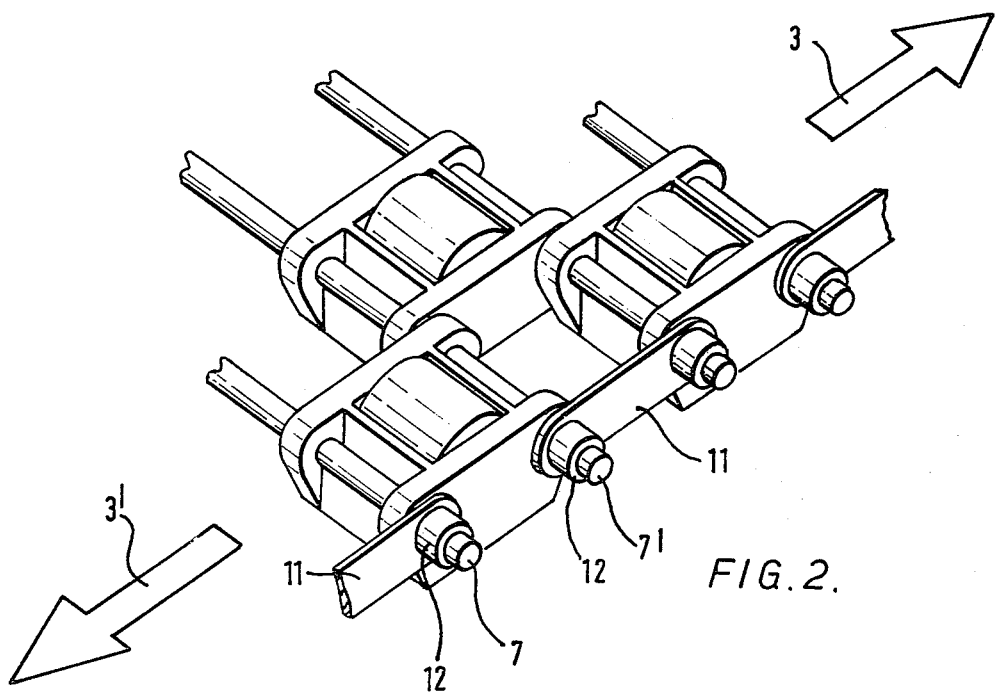

The conveyor of FIG. 2 is the same as that of FIG. 1 except that the tie rods extend laterally of the conveyor and carry loose rollers 12. Suitable sprockets engaging the rollers 12 provide the necessary drive to the conveyor.

Figure 3:
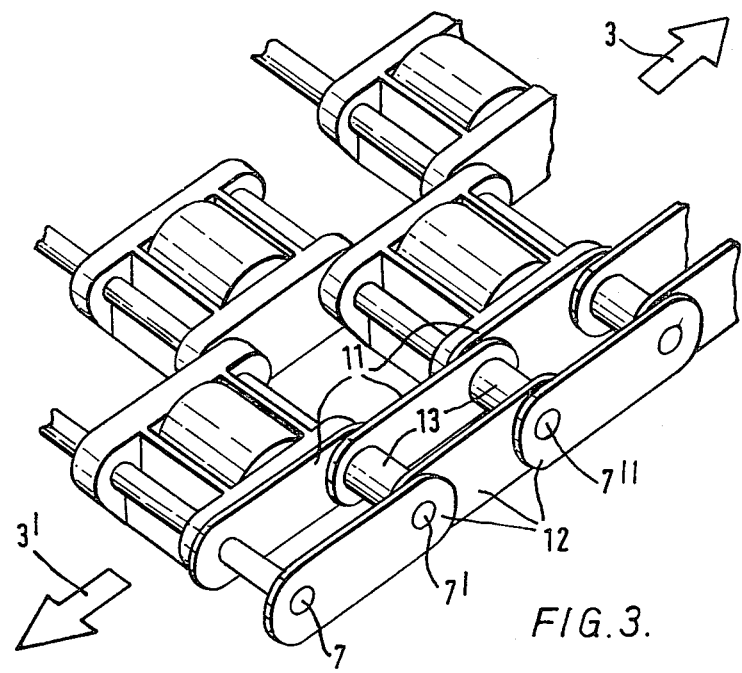

The conveyor of FIG. 3 is similar to that of FIG. 1 except that the tie rods carry a chain along one or both edges of the conveyor. As can be seen from FIG. 3 the chain comprises two rows of links 11, 12 separated by hollow pins 13 supported by the tie rods 7, 7' etc. The conveyor is driven by one or more sprockets engaging the chain.

Figure 4:
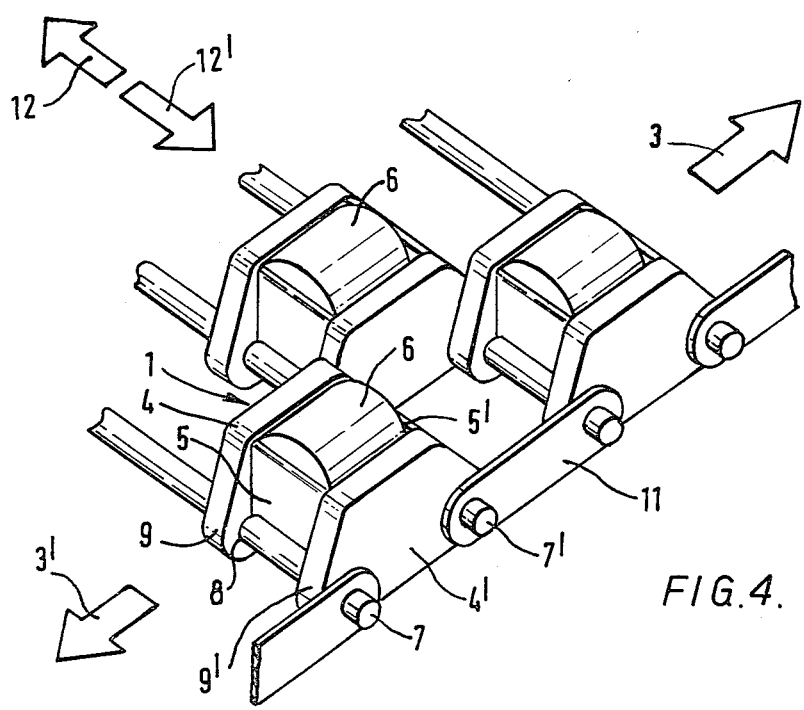
Figure 5:
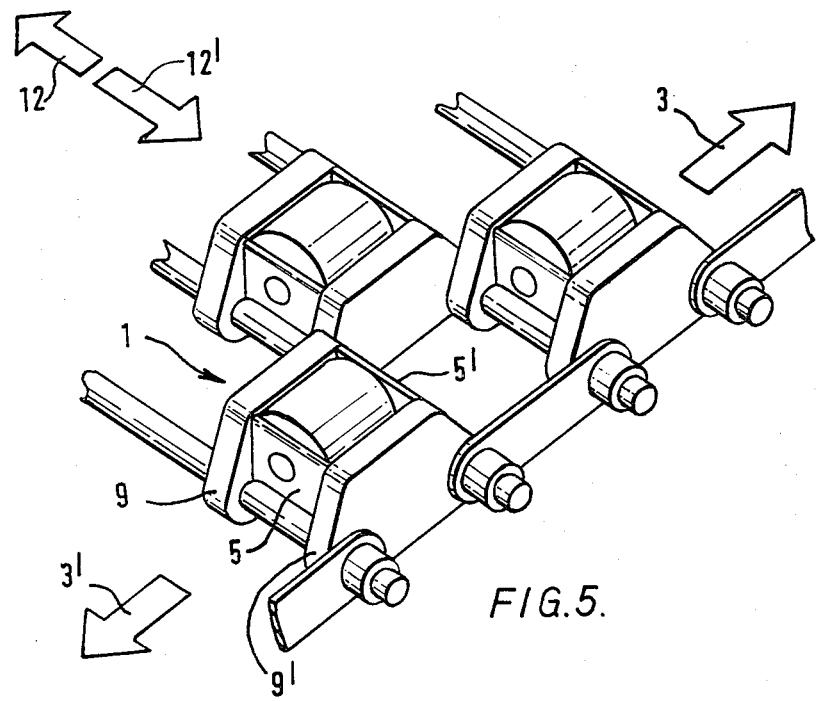
Figure 6:
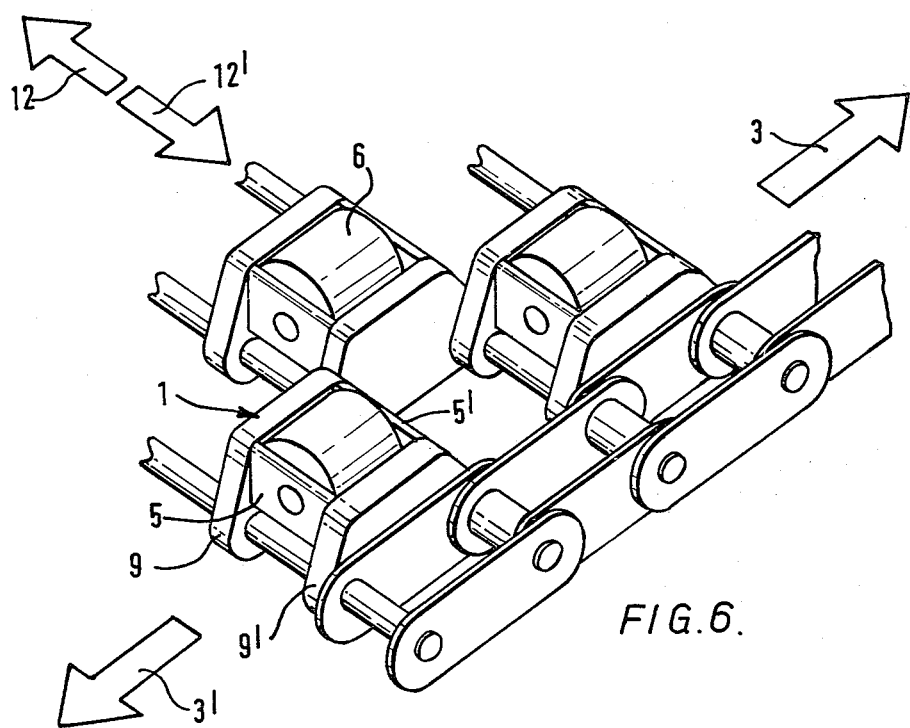

The conveyers of FIGS. 4, 5, and 6 are similar to those of FIGS. 1, 2 and 3 respectively except that the wheels or rollers 6 are now mounted with their axes of rotation extending in the direction of travel 3, 3' of the conveyor. The axles or stub axles of the wheels or rollers 6 are now mounted in the side plates 5, 5'. Thus the direction of wheel or roller travel 12, 12' is now at right angles to the direction of conveyor travel. In the particular embodiments shown in FIGS. 4, 5 and 6, the cradles 1 have been inverted so that the ears 9, 9' are at the bottom of the end walls 4, 4'. The drive of each conveyor in FIGS. 4, 5 and 6 is the same as in FIGS. 1, 2 and 3 respectively.

The conveyors operate as follows:

With the axes of the wheels 6 in line with the direction of movement 3, 3' of the cradles 1 as in FIGS. 4, 5 and 6, the conveyors can be used to accept products entering sideways and being discharged sideways. In this mode it is more usual to drive the conveyor with an intermittent or indexing motion. With an indexing motion, since the cradles are stationary when a product is being fed onto, or being discharged from the conveyor, it is possible to contact the underside of the wheels with a moving belt at entry or discharge areas. This technique ensures a clean positive entry or exit rather than relying on the existing motion of the product.

Various modifications may be made to the above embodiments. Thus, instead of an axle or stub axles being provided on the wheels 6, the end walls 4, 4' (in FIGS. 1 to 3) and/or the side walls 5, 5' in (FIGS. 4 and 5) could be provided with aligned projections engaging corresponding recesses, e.g. with a snap fit, on the axes of the wheels 6.

The cradles shown may be replaced by cradles having a substantially "H" shape. A wheel or roller would be arranged on either side of the bridge of the "H" with the rods passing through the legs of the H on either side of the bridge and parallel thereto. Thus, the tie rods would not only support the cradles, but also carry the wheels or rollers. This arrangement provides double the number of wheels or rollers, since there are two wheels or rollers to each cradle.

Figure 7:
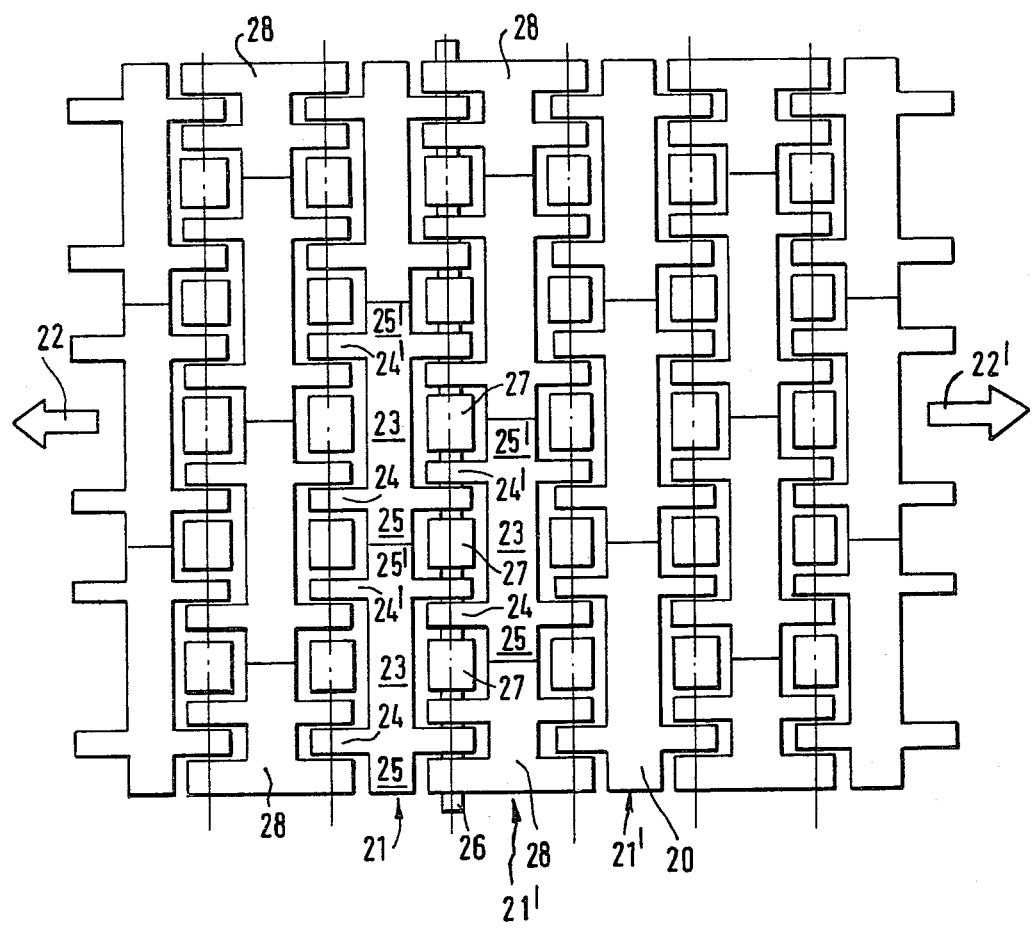
FIG. 7 shows in plan view part of a modified conveyor according to the invention.

In yet a further embodiment, shown in FIG. 7, the conveyor has a plurality of links 20 arranged in rows 21, 21', 21" extending transversely of the direction of movement of the conveyor represented by the arrows 22, 22'. Each link 20 has when viewed in plan a substantially "H" shape with the bridge 23 of the "H" extended to project laterally outwards from the arms 24, 24' of the "H." The bridges 23 of the links extend in parallel transverse rows, the links of adjacent rows, e.g. 21, 21', being staggered with respect to each other and the arms of adjacent rows 21, 21' overlapping each other when viewed in a transverse direction. The links form a plurality of cradles, each cradle being formed by the bridge 23 and one end of the arms 24, 24' of a first link of one row and a bridge extension portion 25 or 25' together with one arm 24 or 24' of each of a pair of adjacent links of an adjacent row. The links 20 are pivotably carried by rods 26 extending parallel to the bridges 23 of the links through one end of each arm 24, 24' of one row 21 and also through an adjacent end of each arm 24, 24' of an adjacent row 21'. The rods support rotatable members in the form of wheels or rollers 27 for rotation in the cradles. The wheels or rollers 27 extend above the respective cradle for rolling contact with an object placed on the conveyor.

It will be noted that when viewed in the direction of movement of the conveyor represented by the arrows 22, 22' the wheels or rollers 27 of adjacent rows are aligned with each other.

The links are, preferably, formed from plastics material and alternate rows are provided at each end with edge links 28. Each link 28 when viewed in plan also has a substantially "H" shape but with a relatively short bridge projecting laterally outwards from the inner arm only of the "H."

The drive of the conveyor shown in FIG. 7 can be the same as that shown in FIG. 2 or FIG. 3.

I claim:

1. A conveyor comprising:
   a plurality of cradles, each of said plurality of cradles further having a substantially "H" shape;
   a plurality of rotatable members mounted in spaced relationship to said plurality of rotatable cradles, each of said rotatable members further being mounted on each side of the bridge of the "H" shape of each of said plurality of cradles; and
   means for rotatably mounting each of said rotatable members in each of said plurality of cradles such that each of said rotatable members extends above each of said plurality of cradles for rolling contact with an object placed on the conveyor.

2. A conveyor for moving an object, said conveyor comprising:
   a plurality of cradles, each of said plurality of cradles comprising:
     at least two parallel support members; and
     transverse spacer means connecting said at least two parallel support members to form a generally "H" shaped cradle;
   a plurality of rotatable members mounted in spaced relationship to said plurality of cradles, each of said plurality of rotatable members having an outer diameter extending above said plurality of cradles for rolling contact with the object placed thereon; and means for pivoting at least one of said plurality of cradles with respect to at least one other of said plurality of cradles so as to form the conveyor, said pivoting means mounted to said at least two parallel support members of each of said plurality of cradles such that when an object is placed on the conveyor, the object contacts only said plurality of rotatable members for unobstructed rolling contact therewith thereby moving the object along the conveyor without contacting said plurality of cradles.

3. A conveyor as claimed in claim 1 or 2, wherein said plurality of rotatable members are further oriented in spaced relationship to said plurality of cradles with the axis of said plurality of rotatable members mounted transversely of the direction of movement of the conveyor.

4. A conveyor as claimed in claim 1 or 2, wherein said plurality of rotatable members are further oriented in spaced relationship to said plurality of cradles with the axis of said plurality of rotatable members mounted in the direction of movement of the conveyor.

5. A conveyor as claimed in claim 2, wherein said means for pivoting further comprises:
first means for interconnecting said at least one of said plurality of cradles to said at least one other of said plurality of cradles to form at least one row such that said at least one of said plurality of cradles in each of said rows is spaced a predetermined distance from said at least one other of said plurality of cradles.

6. A conveyor as claimed in claim 2, wherein said means for pivoting further comprises:
second means for interconnecting said at least one of said plurality of cradles in each of said rows to said at least one other of said plurality of cradles in an adjacent row such that said at least one of said plurality of cradles is staggered a predetermined distance with respect to said at least one other of said plurality of cradles.

7. A conveyor as claimed in claim 2, wherein said means for pivoting further comprises:
a plurality of rods extending transversely of the conveyor;
said first end of each of said at least two parallel support members further having a first hole;
said second end of each of said at least two parallel support members further having a second hole; and
one of said rods pivotably engaging said first hole of said first end of said at least two parallel support members and another of said rods pivotably engaging said second hole of said second end of said at least two parallel support member to form rows of said cradles and to pivotably support said plurality of cradles.

8. A conveyor as claimed in claim 7, wherein each of said rows of said cradles further being connected to an adjacent parallel row of cradles by said one of said rods in said row acting as said one other of said rods of the adjacent row of cradles and by said one other of said rods in said row acting as said one of said rods of the adjacent row of cradles.

9. A conveyor as claimed in claim 2, wherein said plurality of rotatable members further being removably mounted in said plurality of cradles enabling the axis of rotation of each of said rotatable members to be oriented from a first position with the axis of rotation of each of said rotatable members lying in the direction of movement of the conveyor to a second position with the axis of rotation of each of said rotatable members extending transversely of the conveyor.

10. A conveyor as claimed in claim 7, wherein transverse spacer means further comprises two side walls interconnecting said at least two parallel support members.

11. A conveyor as claimed in claim 10 or 1, wherein each of said plurality of cradles is formed as a single plastics moulding.

12. A conveyor as claimed in claim 7, wherein said means for pivoting further comprises:
said plurality of cradles are arranged in parallel transverse rows and said rotatable members of adjacent rows are aligned with each other when viewed in the direction of movement of the conveyor.

13. A conveyor as claimed in claim 7, wherein
each of said rotatable members further having a central hole; and
wherein each of said rods further extends transverse to the conveyor and passes through said central hole in each of said rotatable members to support said rotatable members in the cradle.

14. A conveyor comprising:
a plurality of cradles each of said plurality of cradles having at least two links, each of said at least two links has, when viewed in plan, a substantially "H" shape with the bridge of the "H" extended to project laterally outwards from the arms of the "H," the links being arranged in parallel transverse rows, the links of adjacent rows being staggered with respect to each other and the arms of adjacent rows overlapping each other when viewed in a transverse direction, such that each cradle is formed by the bridge and one end of the arms of a first link of one row and a bridge extension portion together with one arm of each of a pair of adjacent links on an adjacent row, a plurality of rotatable members mounted in spaced relationship to said plurality of cradles; and means for rotatably mounting each of said plurality of rotatable members in each of said plurality of cradles such that each of said plurality of rotatable members extend above each of said plurality of cradles for rolling contact with an object placed thereon.

15. A conveyor as claimed in claim 13, wherein:
each of said plurality of cradles further comprises:
a first projection mounted laterally outward from one of said at least two parallel support members in line with said transverse spacer means and a second projection mounted laterally outward from one other of said at least two parallel support members in line with said transverse spacer means;
said at least one of said plurality of cradles further being arranged in a parallel transverse row, said at least one other of said plurality of cradles further being arranged in an adjacent parallel transverse row;
said at least two parallel support members in said at least one of said plurality of cradles in said parallel transverse row further being staggered with respect to said at least two parallel support members in said at least one other of said plurality of cradles in said adjacent parallel transverse row;

said first and second projections of said at least one of said plurality of cradles further being in overlapping relationship to said first and second projections of said at least one other of said plurality of cradles;

one of said rods further extending through each of said first hole in said each of said at least two parallel support members in said at least one of said plurality of cradles in said parallel transverse row and through each of said second hole in said at least one other of said at least two parallel support members in said at least one other of said plurality of cradles in said adjacent parallel transverse row.

16. A conveyor as claimed in claim 14 or claim 15, further comprising:

at least two edge links;

first means for attaching one of said at least two edge links to said first projection to form a generally "H" shape with one of said at least two parallel support members of said at least one other of said plurality of cradles at one transverse end of said adjacent row; and second means for attaching another of said at least two edge links to said second projection to form a generally "H" shaped with one other of said at least two parallel support members of said at least one other of said plurality of cradles at the opposite transverse end of said adjacent row;

whereby said at least two edge links in said adjacent row are staggered with respect to said at least two parallel support members in said parallel transverse row and said first and second projections in said parallel transverse rows are in spaced overlapping relation to said first and second projections in said adjacent row.

17. A conveyor as claimed in claim 14 or 16, wherein said links are formed of plastics material.

18. A conveyor as claimed in claim 2 wherein:

each of said at least two parallel support members further has a first end and a second end; and said transverse means further being connected to each of said at least two parallel support members between said first end and said second end of each of said at least two support members to form a generally "H" shaped cradle.

19. A conveyor as claimed in claim 18 wherein:

one of said plurality of rotatable members further being mounted on one side of said transverse spacer means between each of said first end of said at least two parallel members, another of said plurality of rotatable members further being mounted on the opposite side of said transverse spacer means between each of said second end of said at least two parallel support members; and said pivoting means further comprising:

means for connecting said at least one of said plurality of cradles with respect to said at least one other of said plurality of cradles to form a plurality of rows;

said plurality of cradles in one of said plurality of rows being staggered with respect to said plurality of cradles in another of said plurality of rows with said first end of said each of said at least two support members in said one of said plurality of rows overlapping said second end of said each of said at least two support members in said another of said plurality of rows; and said connecting means further comprising:

each of said rotatable members further having a concentric hole;

each of said first end of each of said at least two parallel support members further having a first hole;

each of said second end of each of said at least two parallel support members further having a second hole; and a plurality of rods extending transversely of the conveyor, one of said rods pivotably engaging each of said first hole of each of said first end of said at least two parallel support members and another of said rods pivotably engaging each of said second hole of each of said second end of said at least two parallel support members to form rows of said cradles and to pivotably support said plurality of cradles and to pass through each of said first and second holes in said rotatable members to support each of said plurality of rotatable members in said cradle.

20. A conveyor as claimed in claim 18 wherein one of said plurality of rotatable members further being mounted on one side of said transverse spacer means between said each of said first end of said at least two parallel members, another of said plurality of rotatable members further being mounted on the opposite side of said transverse spacer means between each of said second ends of said at least two parallel support members; and said pivoting means further comprising:

each of said rotatable members further having a concentric hole;

said first end of each of said at least two parallel support members further having a first hole;

said second end of each of said at least two parallel support members further having a second hole; and a plurality of rods extending transversely of the conveyor, one of said rods pivotably engaging said first hole of each of said first end of said at least two parallel support members and another of said rods pivotably engaging said second hole of each of said second end of said at least two parallel support members to form rows of said cradles and to pivotably support said plurality of cradles and each of said rotatable members in said cradles.

* * * * *